Patented Apr. 7, 1931

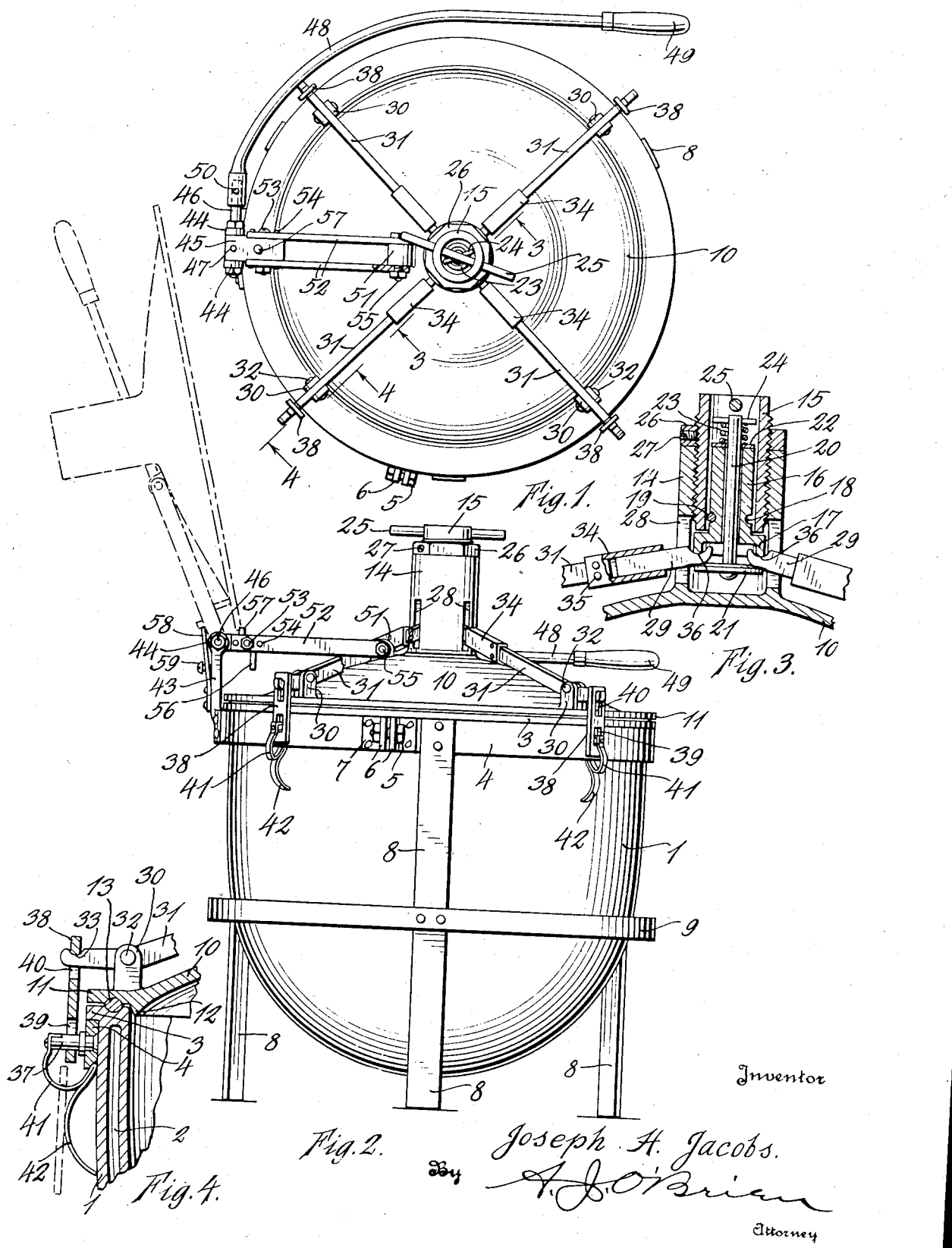

1,799,905

UNITED STATES PATENT OFFICE

JOSEPH H. JACOBS, OF ROCHESTER, NEW YORK

PRESSURE COOKER

Application filed December 23, 1929. Serial No. 416,072.

This invention relates to improvements in pressure cookers of the type employed for cooking meats and vegetables in restaurants, hotels and other places.

This invention relates to an improvement of the construction shown and described in United States Letters Patent No. 1,439,000, granted to me on December 19, 1922, and has reference more particularly to the means employed for securing the cover to the container or the pot in such a manner that it will resist the steam pressure.

The specific embodiment of the pressure cooker which forms the subject of this invention relates more particularly to a pressure cooker of large capacity, as distinguished from a pressure cooker of a size suitable for domestic use like the one shown and described in the patent above identified.

In restaurants and hotels where a large number of people are fed, food is prepared in large quantities and the pressure cooker that forms the subject of this invention is usually constructed of such capacity that it will hold approximately fifty gallons, but it can, of course, be made smaller or larger as may be desired.

This invention can be most clearly described and most readily understood when reference is had to the accompanying drawing in which the preferred construction has been illustrated, and in which:

Fig. 1 is a top plan view of the pressure cooker;

Fig. 2 is a side elevation thereof;

Fig. 3 is a section taken on line 3—3, Fig. 1; and

Fig. 4 is a section taken on line 4—4, Fig. 1.

In the drawing reference numeral 1 represents the container or the pot. This is preferably made from cast metal, such as aluminum and is provided with a steam jacket 2, which is formed by means of a core when the pot is cast. A flange 3 extends outwardly about the open end of the container and located directly beneath this flange is a steel band 4. This band is clamped against the outer surface of the pot by means of a bolt 5 that extends through the radially projecting flanges 6 of the angle brackets 7, in the manner shown in Fig. 2. Three legs 8 are secured to the steel band at points 120 degrees apart and serve as supports or legs. The supports 8 are connected by means of a circular band 9 and the pot 1 is therefore held above the floor by the support comprising members 4, 8 and 9. A cover 10 is supported on the top of the pot and is adapted to form a steam tight closure therefor. The cover 10 is provided with a flange 11 that is adapted to extend over the upper surface of flange 3 in the manner shown in Fig. 4. The cover is also provided with an annular rib 12 on its lower surface and this serves to position the cover on the pot. The adjacent surfaces of flanges 3 and 11 are provided with substantially, semi-circular grooves which are adapted to receive the gasket 13. A tubular member 14 extends upwardly from the central portion of the cover in the manner shown most clearly in Figs. 2 and 3. The inner surface of member 14 is threaded for the reception of the threaded tubular plug 15. Located within the tubular plug 15 is another plug which has been designated by reference numeral 16. The lower end of plug 16 has a cylindrical downwardly extending flange 17 and the plug portion is provided with an annular grove 18. A pin 19 extends through the tubular plug and engages the groove 18 in the manner shown in Fig. 3 and this pin serves to hold plug 16 against longitudinal movement while permitting it to rotate with respect to the tubular plug 15. Plug 16 is provided with an axial opening for the reception of the cylindrical member 20 to the lower end of which a convex disk or washer 21 is secured. A washer 22 surrounds the upper end of member 20 and rests on the upper end of plug 16. A spring 23 has its longer end resting on the washer 22 and its upper end abutting the pin 24. Spring 23 is under compression and tends to move the washer 21 upwardly. The upper end of tubular plug 15 has a diametrical opening through which the handle 25 extends. A lock nut 26 has a threaded engagement with plug 15 and can be held in adjusted position by means of a set screw 27. The tubular member 14 is provided with a number of radial slots 28, through which the extensions 29 of the levers project in the manner shown in Fig. 3.

The cover is provided with a plurality of pairs of spaced lugs 30, between which the levers 31 are located and to which they are pivotally attached by means of pins 32. The outer ends of levers 31 extend a short distance beyond the periphery of the cover and are each provided with a notch 33. Secured to the inner end of each lever is a sleeve 34. This sleeve is held in place on the lever by means of rivets 35. The outer ends of the extensions 29 project into the sleeves 34 and are free to move longitudinally so as to telescope with respect to the sleeve. The inner ends of extensions 29 are provided with a curved recess 36 on their upper ends for the reception of the flange 17. The convex washer 21 engages the under surfaces of the extensions 29 and hold them against the lower edge of flange 17, so that when the tubular plug 15 is rotated, extensions 29 will be raised and lowered and since they are connected with the inner ends of levers 31, these will be tilted about pivots 32.

The band 4 is provided with outwardly extending lugs 37, one lug being provided for each of the levers 31. A line 38 is associated with each lug 37. These links may be constructed in specifically different ways but have been shown as made from flat steel bars each link having two openings, one of which has been indicated by reference numeral 39 and the other by reference numeral 40. The openings 39 are adapted to receive the lugs 37, while openings 40 are adapted to receive the outer ends of levers 30, in the manner shown in Fig. 4. In order to prevent the links from falling off from the lugs and becoming lost, a retainer 41 has been provided for each lug. These retainers consist of a metal band having one end secured to the outer end of the lug with which it is associated by means of a screw 42. These retainers are curved in the manner shown in Fig. 4 and the lower arched portion which has been designated by reference numeral 42 acts as a stop for the link 38 when it is in the dotted line position shown in Fig. 4. When the cover is to be secured to the container or the pot, the tubular plug 15 is rotated so as to move it upwardly as far as it will go, this moves the outer ends of the levers downwardly. The links 38 are now put into place so that the outer ends of levers 31 project through the openings 40 and if tubular member 15 is now rotated so as to move downwardly, the levers will have their inner ends moved downwardly, which, in turn will move the outer ends upwardly, thereby putting the links 38 under tension and forcing the cover against the top of the pot so as to form a steam tight seal between the two. Since the flange 17 moves in a straight line, whereas the levers rotate about pivots 32, it is obvious that the distance between the pivots and the flange 17 varies and this is taken care of by the sliding movement between the extensions 29 and the sleeves 34.

Since the cover is quite heavy and in order to facilitate the opening and closing of this cover, I have provided a hinge device which consists of a hinge member 43 that is secured to the band 4 by rivets or other suitable means. The upper end of member 43 has two spaced lugs 44 between which the outer end of the second hinge member 45 is located. A pin 46 extends through openings in the lugs 44 and through an opening in member 45 and is connected to the latter by means of a pin 47 which holds it against movement with respect to member 45. A curved pipe 48 is secured to one end of the hinge pin 46 and has its outer end provided with a handle 49. This pipe is held against rotation with respect to pin 46 by means of a transverse pin 50. The cover is provided with a lug 51 which is located to one side on the tubular member 14. Two bars 52 have one end secured to hinge member 45 by means of a bolt 53 and pins 54, and have their other ends connected with pins 51 by means of a bolt 55. Members 45 and 52 form a link that connects the cover with hinge member 43 and permits the cover to be moved from the full line position shown in Fig. 2, to the dotted line position.

A stop 56 extends downwardly from the link and this engages the upper surface of the cover to limit its rotation when it is moved to open position.

In order to limit the outward movement of the cover, the link comprising members 45 and 52 is provided with a pin 57 that extends upwardly. A resilient stop member 58 is secured to the hinge member 43 by means of screws or rivets and this extends upwardly to such a distance that when the cover is moved to dotted line position pin 57 will engage the upper end of member 58 and limit the outward movement. A screw 59 determines the extent to which member 58 can flex and serves as a means for adjusting the extent of the movement.

From the above description it will be apparent that I have produced a pressure cooker provided with a cover which is hingedly attached thereto and which is held in place by means of a locking mechanism that is positive in its action and which can be readily adjusted so as to secure a tight joint between the cover and the container.

Particular attention is called to the sliding connection between the extensions 29 and the levers as by this simple expedient, the construction is greatly simplified and reliable results are secured.

Having described the invention what I claim as new is:

1. In a device of the class described, in combination, a container having one end open, a hinge member secured to the container and projecting above the open end thereof, a cover adapted to close the open end of the container, a lug extending upwardly from the cover to one side of the center, a link pivotally connected at one end with the lug and at the other end with the hinge member, and a stop extending downwardly from the link and adapted to engage the cover.

2. In a device of the class described, in combination, a container having one end open, a hinge member secured to the container and projecting above the open end thereof, a cover adapted to close the open end of the container, a lug extending upwardly from the cover to one side of the center, a link pivotally connected at one end with the lug and at the other end with the hinge member, a stop extending downwardly from the link and adapted to engage the cover, a pin extending upwardly from the link, and a stop projecting upwardly beyond the hinge member and adapted to engage the pin carried by the link for limiting the outward movement thereof.

3. In a device of the class described, in combination, a container having one end open, a hinge member secured to the container and projecting above the open end thereof, a lug extending upwardly from the cover to one side of the center, a link pivotally connected at one end with the lug and at the other end with the hinge member, a stop extending downwardly from the link and adapted to engage the cover, a pin extending upwardly from the link, a stop projecting upwardly beyond the hinge member and adapted to engage the pin carried by the link for limiting the outward movement thereof, and a handle attached to the link for rotating the same.

4. In a device of the class described, in combination, a container open at one end, a cover adapted to be secured to the open end of the container, and means for securing the cover to the container, said last named means comprising a plurality of levers pivotally connected with the cover near the outer edge of the latter, means for making connection between the outer ends of the levers and the container, a clamping device secured to the central portion of the cover and a telescopic connection between the inner ends of the levers and the clamping device.

5. In a device of the class described, having in combination, a container open at one end and a cover adapted to close the open end thereof, means for securing the cover to the container, said means comprising a tubular member extending outwardly from the cover near the center thereof, a tubular plug threadedly connected with the tubular member, the tubular member having radial slots, means for rotating the tubular plug, a plurality of levers pivotally connected with the outer edge of the cover, said levers extending to both sides of the pivots, the inner ends of the levers having extensions telescopically connected therewith, the inner ends of the extensions projecting through the slots and into the interior of the tubular member, and means engaging underneath the inner ends of the extensions for holding them against the lower end of the tubular plug.

In testimony whereof I affix my signature.

JOSEPH H. JACOBS.